(12) United States Patent
Xi

(10) Patent No.: US 9,971,597 B2
(45) Date of Patent: May 15, 2018

(54) VIRTUAL OPERATING AREA SUPPORTING CUSTOMIZED DEFINITION AND OPERATING METHOD AND SYSTEM ARCHITECTURE THEREOF

(71) Applicant: GUANGZHOU FYUTOPIA INFORMATION TECHNOLOGY CO., LTD, Guangzhou, Guangdong (CN)

(72) Inventor: Jianqing Xi, Guangzhou (CN)

(73) Assignee: Guangzhou Fyutopia Information Technology Co., Ltd., Guangzhou, Guandong (CN)

( * ) Notice: Subject to any disclaimer, the term of this patent is extended or adjusted under 35 U.S.C. 154(b) by 575 days.

(21) Appl. No.: 14/491,795

(22) Filed: Sep. 19, 2014

(65) Prior Publication Data

US 2015/0012910 A1    Jan. 8, 2015

Related U.S. Application Data

(63) Continuation-in-part of application No. PCT/CN2012/072657, filed on Mar. 21, 2012.

(51) Int. Cl.
  *G06F 9/455*  (2018.01)
  *G06F 9/44*   (2018.01)

(52) U.S. Cl.
  CPC .............. *G06F 8/73* (2013.01); *G06F 8/20* (2013.01); *G06F 9/455* (2013.01); *G06F 9/45558* (2013.01)

(58) Field of Classification Search
  None
  See application file for complete search history.

(56) References Cited

U.S. PATENT DOCUMENTS

| | | | |
|---|---|---|---|
| 7,779,091 B2 * | 8/2010 | Wilkinson | G06F 9/505 707/999.01 |
| 8,010,701 B2 * | 8/2011 | Wilkinson | G06F 9/505 709/217 |

(Continued)

FOREIGN PATENT DOCUMENTS

| | | |
|---|---|---|
| CN | 101093448 A | 12/2007 |
| CN | 101377745 A | 3/2009 |

*Primary Examiner* — Jae Jeon
*Assistant Examiner* — Douglas Slachta
(74) *Attorney, Agent, or Firm* — Muncy, Geissler, Old & Lowe, P.C.

(57) ABSTRACT

A virtual operating area supporting customized definition, and an operating method and system architecture thereof that enables a user to configure a business service operating environment according to user's requirements, so as to form multiple service operating environments oriented to different requirements. Multiple virtual operating areas, related function tools thereof, and supporting platforms are formed into software architecture, operating methods, and a system device of a business information system. In the solution, by using a system building method based on a group of concepts, comprising 'virtual operating area', 'share', 'tool', 'data', 'interactive room', and so on, that are comprehensible to ordinary users, a user can quickly master a method for building a virtual operating area oriented software system, and can build a processing environment suitable for 'working', and process services according to a procedure familiar to the user.

5 Claims, 10 Drawing Sheets

(56) References Cited

U.S. PATENT DOCUMENTS

| | | | | |
|---|---|---|---|---|
| 8,127,291 B2* | 2/2012 | Pike | | G06F 9/45558 718/1 |
| 8,413,116 B2* | 4/2013 | Gray | | G06F 9/4443 717/104 |
| 8,543,926 B2* | 9/2013 | Giles | | G06Q 10/10 345/419 |
| 8,549,491 B2* | 10/2013 | Chun | | G06F 11/3688 703/13 |
| 8,862,597 B2* | 10/2014 | Barak | | G06F 17/30867 707/741 |
| 9,164,990 B2* | 10/2015 | Vainer | | G06F 17/30 |
| 2003/0117436 A1* | 6/2003 | Kautto-Koivula | | G06F 3/0481 715/762 |
| 2004/0107125 A1* | 6/2004 | Guheen | | G06Q 50/01 705/319 |
| 2006/0026235 A1* | 2/2006 | Schwarz | | G06Q 10/10 709/205 |
| 2006/0129935 A1* | 6/2006 | Deinlein | | G06F 17/30861 715/733 |
| 2007/0256073 A1* | 11/2007 | Troung | | G06F 21/606 718/1 |
| 2007/0294632 A1* | 12/2007 | Toyama | | G06F 3/038 715/764 |
| 2009/0164994 A1* | 6/2009 | Vasilevsky | | G06F 9/45533 718/1 |
| 2009/0183251 A1* | 7/2009 | Deinlein | | G06F 17/30861 726/12 |
| 2009/0249335 A1* | 10/2009 | Vasilevsky | | G06F 9/45533 718/1 |
| 2009/0254843 A1* | 10/2009 | Van Wie | | H04L 12/1822 715/757 |
| 2009/0320035 A1* | 12/2009 | Ahlgren | | G06F 9/468 718/104 |
| 2010/0088697 A1 | 4/2010 | Clardy | | |
| 2011/0061045 A1* | 3/2011 | Phillips | | G06F 9/45541 717/173 |
| 2011/0061046 A1* | 3/2011 | Phillips | | G06F 9/45533 717/176 |
| 2011/0113426 A1 | 5/2011 | Kung et al. | | |
| 2011/0246340 A1* | 10/2011 | Dahod | | G06Q 10/06311 705/30 |
| 2011/0252320 A1* | 10/2011 | Arrasvuori | | G06F 1/1626 715/704 |
| 2011/0320961 A1* | 12/2011 | Sriraghavan | | G06F 9/4445 715/753 |
| 2012/0096395 A1* | 4/2012 | Ording | | G06F 9/4443 715/790 |
| 2012/0166485 A1* | 6/2012 | Tashiro | | G06F 17/30525 707/783 |
| 2012/0233668 A1* | 9/2012 | Leafe | | G06F 9/5022 726/4 |
| 2013/0139081 A1* | 5/2013 | Alon | | G06Q 10/10 715/765 |

* cited by examiner

VIRTUAL OPERATING AREA SUPPORTING CUSTOMIZED DEFINITION AND OPERATING METHOD AND SYSTEM ARCHITECTURE THEREOF

FIELD OF THE INVENTION

The present invention relates to computer software design and particularly to a virtual operating area supporting customized definition and operating method and system architecture thereof.

BACKGROUND OF THE INVENTION

Conventional design method of a software system generally has to do analysis of user's requirements first; next, design or code various sizes of software function modules according to a specific specification based on the analysis of user's requirements; then the function modules are integrated to form a complete software system. Hence the software system can be seen mainly consisting of program function modules or elements. Such a software system can only be designed, built and modified by professional program developers.

Moreover, in some expert systems based on rule languages, the experts or programmers in a specialized field often try to make rules on knowledge to form rule sets. The software generally consists of the rule sets and interpreters that execute the rules. The software system made in such architecture can be deemed as supporting customized definition made by experts.

In addition, in some blog and Internet space on the Internet, a blog or space defines a user's virtual operating area which can be created upon application of a registered user. In such a virtual operating area the user can upload and download documents such as photos into the area, and share and publish the data to other users in the system, or interact with other users. In such a system, aside from open or close the virtual area to other users, the virtual area as a whole is not operable by the user. Particularly, the user cannot link a plurality of virtual areas to build a structuralized virtual area architecture based on a specific business objective, neither can the user install or deploy specific operation tools in the virtual area according to user's own requirements. As a result, such a virtual area can only be used for information publication and interaction, but cannot support building of service systems such as management information system (MIS), enterprise resource planning (ERP) and office automation (OA).

SUMMARY OF THE INVENTION

In view of the aforesaid disadvantages of the existing techniques, it is the object of the present invention to provide a technique to allow users to configure by themselves business operating environments according to business requirements to form multiple virtual business operating environments oriented to different requirements. The multiple business operating environments and related function tools and supporting platforms are integrated together, forming a business information system with user-defined (or customized) virtual operating areas, the operating methods in the areas, and a system architecture thereof.

To achieve the foregoing object the present invention employs techniques as follows:

A virtual operating area supporting customized definition, including:

one or more virtual operating areas, each includes one or more area element objects and operating authority rules. The area element objects are of these kinds: users, file data, function tools and/or other virtual operating areas. The users include creators and operators of the virtual operating areas. The file data include computer documents of various formats. The tools are software and hardware systems. The operating authority rules specify operating authority of the users regarding the area element objects. These element objects are represented by their identifiers in a virtual area and many other kinds of objects such as electronic devices can be added in a virtual operating area as its element objects;

a share relationship table which specifies share relationship. The share relationship means operating authority of different users on a same virtual operating area or area element objects;

a virtual operating area engine which is a supporting software to support users to operate the virtual operating area and the area element objects;

a tool configuration document integrated in the virtual operating area engine to register tool identifiers, identifiers of the virtual operating area where the tools are running, a pair table of tool input parameters and area element objects, a pair table of tool output parameters and area element objects, operator operating authority information, tool execution code storage address and tool execution code calling fashion;

repositories which include a virtual operating area repository to store virtual operating areas and related information thereof. The related information includes virtual operating area identifiers, area element objects, operating authority rules, and share relationship table. The repositories also include a tool repository to store tool codes, tool registration tables and tool receiving tables; and further include a user repository to store user information and their system identifiers. The users include computer system operators or automatic devices;

a tool processor which operates with the tool registration tables, virtual operating area repository, virtual operating area engine and virtual operating areas, and generates tool configuration documents corresponding to the virtual operation areas; and an user input and output (I/O) interface to interact with the users.

In the techniques set forth above, the share relationship is a pattern for the users to access shared objects, and can be divided into two types of relationship as follows:

Common-share relationship: two or more users access or operate the same shared virtual operating areas or area element objects. These users can access or operate the shared virtual operating areas or area element objects according to the same authority rules; and Copy-share relationship: two or more users copy-share a virtual operating area or area element object. The copy-shared virtual operating area or area element object is copied when being shared, and a different user is assigned with a different copy and accesses the corresponding copy according to the same authority rules.

The shared object's copy can have a unique identifier (ID), and software vendors or users determine the copy of a shared object to include zero, partial or total sub-objects thereof, and whether the copy is an independent object with a unique ID.

The virtual operating area engine provides the following functions for users: to search a virtual operating area, enter the virtual operating area, execute and edit operating authority rules, operate on operating area element objects, execute tools, and share operating area element objects. All the executions take place in the virtual operating area entered by the users. The said operating area element object is determined by the users. The executing tool is determined by the users and the tool configuration document of the virtual operating area.

The operating authority rules are generated based on creator authority rules and share relationship. The creator authority rules are the operating authority rules related to the users about the area element object they created.

The tools previously discussed run only in the virtual operating area which receives (i.e., install) the tools. The virtual operating area which receives the tools is designated via the tool receiving tables, and during running input or output takes place. The input of a tool includes the entire or partial element object of the receiving virtual operating area of the tool, or data obtained from input and output (I/O) devices, or other input designated by the developers or users. The output of a tool become area element objects in the virtual operating area which receives the tool, or output via the output devices.

The output devices further can store the repositories and tool configuration documents into readable media.

The tool registration table registers running related information, including demands of the running environment, input parameter demands and output parameter information.

The tool receiving table registers information related to the virtual operating area or user's receiving of the tools after the tools are published. The information include tool object ID, ID of the virtual operating area of the receiving tools, receiving time and receiving user name.

The operating method includes creating operation, more specifically includes:

creating users, and store user information in the user repository;

creating virtual operating areas, and create area element objects for each virtual operating area, and store the related creating information in the share relationship table, and store the information of the created virtual operating area or area element object, and share relationship table in the virtual operating area repository;

creating tools, register tool-related information, and store the tool information in the tool repository;

integrating the virtual operating area repository, user repository and tool repository to the virtual operating area engine;

performing share publishing operation on the area element object, and store share publishing definition generated during the share publishing operation in the share relationship table. In the event that the shared area element object is a tool object, the share information of the tool is stored in the tool receiving table; and generating operating authority rules based on the creator authority rules and share relationship table.

The operating method further includes execution operation which includes:

receiving a share-published object based on the operating authority rules to a selected virtual operating area to make the former become an area element object of the later;

entering a virtual operating area based on the operating authority rules;

exiting from a virtual operating area;

accessing the area element object based on the operating authority rules;

receiving tools in a virtual operating area and install therein based on the operating authority rules; and generate a tool configuration document based on the tool repository, the virtual operating area engine, the operating authority rules, the share relationship table, the tool registration table, the tool receiving table, the tool developing environment and the virtual operating area which receives the tools, and store the tool configuration document in the repository;

integrating the tool configuration document to the virtual operating area engine to implement execution of the tools in the virtual operating area; and storing the aforesaid virtual operating area repository, user repository, tool repository and tool configuration document in the virtual operating area in the readable media of the computer.

The aforesaid share publishing operation means that users who have share publishing authority share the said virtual operating area or area element object to other users so that the other users can access or operate the object. There are two types of share publishing operation, including:

common-share publishing operation: multiple designated receivers can access or perform authorized operation related to one or more objects with same authority, and register related common-share relationship information in the share relationship table; and copy-share publishing operation: this is related to building different copies of one or more objects for each receivers, and to allow the related receivers to do authorized operation on their copies respectively according to the same authority rules, and register the related share relationship information in the share relationship table.

The aforesaid copies of an object are determined by software vendors or users to include zero, partial or total sub-objects of the object, and whether the copies be independent objects with an a unique object ID. A sub-object B of an object A means that A includes B.

The aforesaid share publishing definition is related to the related share publishing information, including a publisher, receivers and shared objects. The publisher is a user, and the receivers include:

Registered users in the system; and

Virtual operating areas created in the system;

The aforesaid tool developing environment is a vendor's specialized developing environment.

The system architecture includes:

a virtual operating area computer, a computer running the virtual operating area engine, processing the information in the share relationship table and executing the operating authority rules;

user operating devices coupled to the said virtual operating area computer to execute user virtual operating area operation, including creating operation and accessing operation of the area element object;

repositories coupled to the virtual operating area computer to store the virtual operating area repository, tool repository, tool receiving table and tool configuration document; and a tool execution device coupled to the virtual operating area computer.

The aforesaid virtual operating area computer includes one or more interconnection units that connect to one another. The interconnection units aim to connect to external hardware devices.

The tool execution device is either the virtual operating area computer, or devices to be connected to the virtual operating area computer via three methods, includes:

In the event that the virtual operating area computer can be linked to a network, the tool execution device is linked to a network component of the virtual operating area computer via the network; the network component is an adapter for a local area network, a wide area network or a wireless network;

The tool execution device is directly connected to the interconnection unit in the virtual operating area computer; and In the event that the virtual operating area computer has a peripheral interface, the tool execution device can be directly connected to the peripheral interface. The peripheral interface includes universal serial bus (USB) port, RS-232 port, line print terminal (LPT) port, Bluetooth port and infrared ray port.

The aforesaid user operating devices support input and output interaction with the users.

The said virtual operating area computer has device control and management software installed inside, and can support signal transmission with the user operating devices, repositories and tool execution device.

The invention, compared with the conventional techniques, can provide many advantages, notably:

The invention defines the virtual operating area in an environment consisting of users, file data, operation tools, interactive (chatting) room and operation rules, employs a processing technique to make the virtual operating area a second-order object operable by the users so that the virtual operating area, together with file data, function tools and users become operable objects of the users, thus users' operation capability is enhanced. In addition, the software system structure includes virtual operating areas as a kind of basic constructs of the software system, besides the original kinds of constructs of software function modules and the like. As a result, the software system not only is built based on the function modules, also based on the virtual operating areas. With virtual operating areas as a base, by adopting code packaging and remote process calling techniques, the function modules can be further packaged as a kind of user tools to allow the ordinary users to install in virtual operating areas and also execute the tools in the virtual operating areas. That's to say the users can configure their virtual operating areas according to business requirements to form multiple business operating environments for different requirements and accomplish various application tasks as desired, and the multiple virtual operating areas and their related function tools and supporting platforms are combined to form a business information system.

The invention also designs two types of share techniques, i.e., common-share and copy-share. The common-share technique allows multiple users to access a same object (including virtual operating area), while the copy-share technique allows multiple users to access respectively different copies of a same object. The share technique allows ordinary users to create or configure an object and publish to other users to access, thereby support the cloud computing mode. The invention further provides a technique to allow the users to receive shared objects and move the objects into their virtual operating areas. This technique enables the users to establish relationship among multiple virtual operating area objects to get the capability of forming an application architecture satisfying actual business requirements, therefore provides the capability for the ordinary users to set up the business architecture in an information system.

The software of this invention is mainly constructed using the virtual operating areas. Such software has the architecture called virtual operating area oriented. It is different from the existing software. The software system of virtual operating area oriented is not constructed with function modules or knowledge rules as the main constructs, but mainly using the virtual operating areas as the constructs, and the users of the virtual operating area oriented software also easily become the builders or developers of the virtual operating area oriented software.

In plain speaking, the virtual operating area is an operating environment area for users to do business, like a working area, service area, business processing area or the like. Technically, the virtual operating area consists of multiple virtual operating area element objects that mean various types of software tools, file data, users and interactive rooms thereof required for doing business. Virtual operating area element objects form a virtual operating area. People in business can set up a virtual operating area according to demands or business progress. The established virtual operating area can be shared by inviting other users to enter the virtual operating area to do operation and interaction.

Different users can configure different virtual operating area element objects according to different business demands to form different virtual operating areas. Based on the principle of dividing "Big event" into "Small events" and event relationships, the virtual operating area of the "Big event" can include the virtual operating areas of the "Small events", or a related relationship can be established among the related virtual operating areas. Users also can share among them through the virtual operating area or element objects in the virtual operating area (i.e. authorized accessing), and establish at the same time a complicated event-related relationship among them.

Such software is not designed through the constructional elements like functional modules, but via a group of concepts such as "virtual operating area", "share", "tool", "data" and "interactive room" that are easy to understand for ordinary users, therefore users can quickly master the constructing method for a virtual operating area oriented software system to set up a processing environment suitable for them to do business, and the users can also perform services according to the procedures they are familiar with in their own fields. As a result, such an approach also can relieve the heaviest burden of the conventional application software developers in learning business knowledge and doing the detailed application requirement analysis.

Although the virtual operating area oriented software mainly consists of the virtual operating areas, it does not exclude other structural components such as software modules, functional components or the like.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
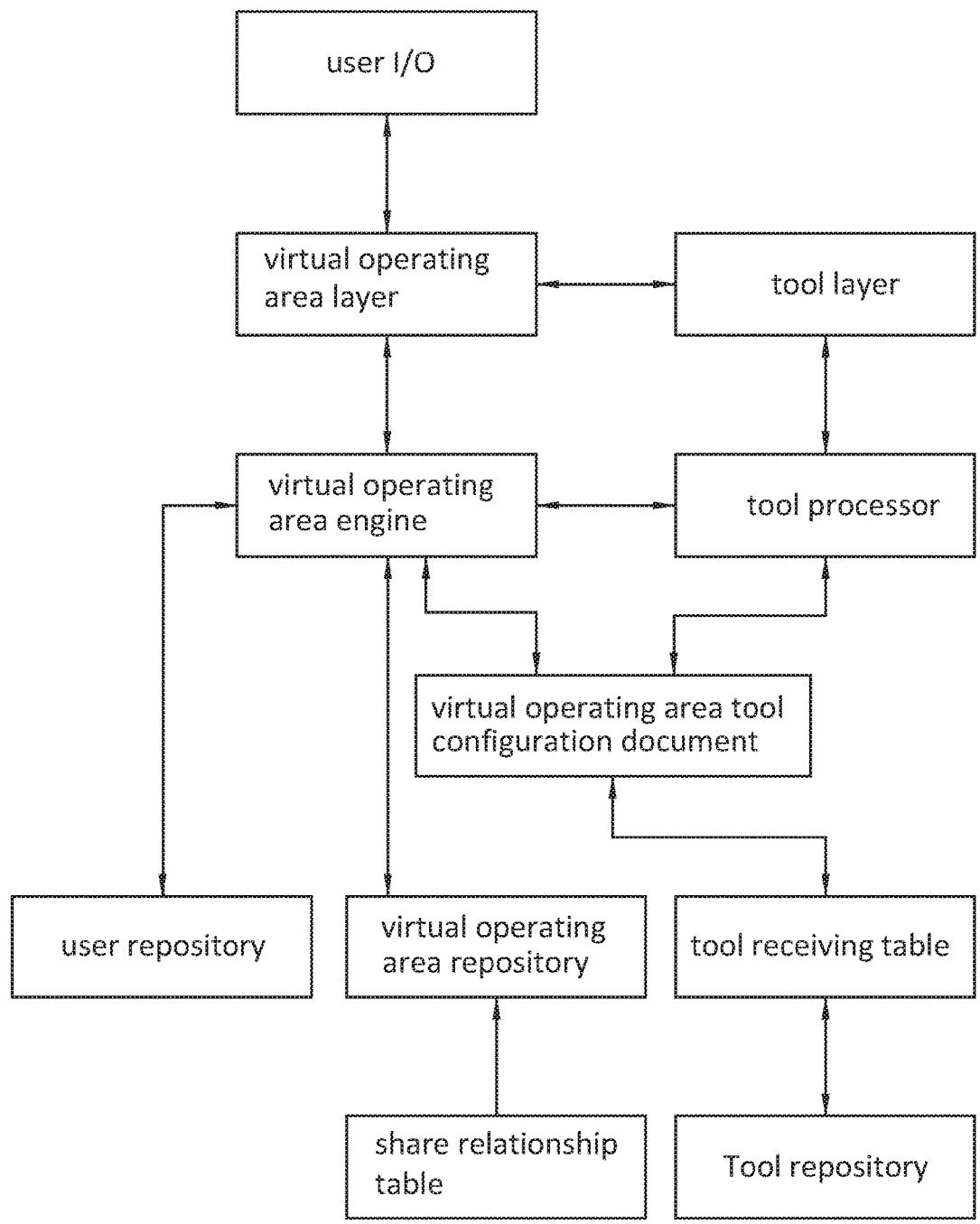
FIG. 1 is a software architecture block diagram of the virtual operating area supporting customized definition according to the invention.

Before the detailed discussion, the phases and terms being used in the description of the invention are defined as follows:

Phases: "related to . . . " and "related with . . . " and the derivative terms thereof means including, in connection with, included, being included, connecting to, coupling to, communicating with, collaborating with, interacting with, juxtaposing, approximating, limiting, having and being equipped with said characteristics.

Controller: means a kind of device, system or a portion thereof which does at least one controlling operation, whether the device is hardware, firmware, software, or their combinations; the function related to any specific controller can be centralized or distributed, either local or remote.

Object: a virtual or real entity that can be represented or processed by computer software, such as virtual operating area, document, interactive room, user, operation tool, a house, a dog, or one set of numbers or the like. The term 'virtual' means a digital representation existed in a computer system.

Virtual operating area: means a virtual area consisting of multiple objects, especially users, file data, software tools, operation rules and other objects that are realized based on related computer software and hardware supporting platforms; meanwhile, the virtual operating area also can be an object by itself and is operable such as being created, deleted and shared.

Virtual operating area oriented software: means a kind of software that its main structure is consisted of various virtual operating areas and software functional modules that support users operation in the virtual operating areas. It is to be understood that such a software is greatly different from the conventional software consisting of only functional modules, namely, a portion of such software is one set of virtual operating area and the elements in the area. The phrase of "Virtual operating area oriented software" in the invention is non-restrictive, but adopts the term of "object-oriented" figuratively, and can also be represented by other phrases or terms to indicate the aforesaid meaning; it is to be noted that any function related to the virtual operating area oriented software system can be centralized or distributed, and such function can be realized physically in a local or remote fashion.

Engine and virtual operating area engine: "engine" in the invention means a software consisted of one set of function module; and "virtual operating area engine" means a software dedicated to support virtual operating area related functions and operable in a suitable computer hardware. It is to be understood that use of the terms of "engine" and "virtual operating area engine" in this invention is non-restrictive, and other phrases or terms can be used to indicate the aforesaid meaning. It is to be noted that the function related to any specific engine can be centralized or distributed, and such function can be realized physically in a local or remote fashion.

Processor: In this invention it means a computer software and hardware system equipped with a definite processing capability. It is to be understood that the term of "processor" in this invention is non-restrictive, and other phrases or terms can be used to indicate the aforesaid meaning. It is to be noted that the function related to any specific processor can be centralized or distributed, and such function can be realized physically in a local or remote fashion.

Tool: In the invention it means a computer hardware and/or software system to realize certain specific function. Tools can be installed, executed or automatically run in a virtual operating area. It is to be understood that the term of "tool" in this invention is non-restrictive, and other phrases or terms can be used to indicate the aforesaid meaning. It is to be noted that the function related to any specific tool can be centralized or distributed, and such function can be realized physically in a local or remote fashion.

Interactive room: means a kind of virtual environment to enable multiple persons to interact via computer and computer networks. It is to be understood that the term of "interactive room" in this invention is non-restrictive, and other phrases or terms can be used to indicate the aforesaid meaning, such as "chatting room".

Share: Generally means "common-share" and "copy-share". "Common-share" means that multiple sharers to operate a same copy of object, while "copy-share" means that different sharer to operate different copy of a same object. It is to be understood that the terms of "share", "common-share" and "copy-share" in this invention are non-restrictive, and other phrases or terms can be used to indicate the aforesaid meaning, such as "offer", "provide" or the like.

Publishing and share publishing: "publishing" means publication of a statement which states some authority granting; "share publishing" in the text of the invention means publication of a share statement of a virtual operating area, a virtual operating area element object or a tool in order for other users receiving the publication to obtain authority to operate the shared object or the copies. It is to be understood that the term of "publishing" in this invention is non-restrictive, and other phrases or terms can be used to indicate the aforesaid meaning, such as "offering", "providing" or the like.

Receiving: means the behavior of a user who gets operating authority of certain objects from a share publishing and places or installs the objects mentioned or implicated in the publishing into a certain virtual operating area to serve as element objects of the virtual operating area, the virtual operating area also is called receiving virtual operating area. A receiving user should have suitable authority on the receiving virtual operating area to receive other objects and place them in the virtual operating area.

Repository: Computer repository to store information. It is to be noted that any specific repository can be centralized or distributed, and can be realized physically in a local or remote fashion, and integrated or separated logically.

Operating: Process on an object, such as read, write, modify, upload, download, execution of tools, by one or multiple users (operators). Operating further includes share publishing, receiving, and registration of tool objects, invocation of tools in a virtual operating area, execution of tools, printing, facsimile and the like.

Embodiment 1

A software architecture of a software system supporting customized definition includes a virtual operating layer consisting of one or more virtual operating areas for users to operate, a share relationship table to store information with respect to share publishing and receiving, a virtual operating area repository to store the virtual operating areas and the information about these areas, a tool repository to store tools, a virtual operating area engine to support users to operate the virtual operating area and its element objects, a user repository to store user information, an operating authority rule repository to store operating authority rules, a virtual operating area tool configuration document to support the tools to execute in the virtual operating area and being integrated into the virtual operating area engine, a tool processor to generate the virtual operating area tool configuration document; wherein the virtual operating area tool configuration document is generated based on a tool registration table, the virtual operating area repository, the running environment of a virtual operating area engine and the resided virtual operating area.

The aforesaid virtual operating area means a user's operating environment and consists of virtual operating area element objects and operating (authority) rules. The virtual operating area element objects include users, file data, tools and (other) virtual operating areas. The file data can be computer documents in various types of formats, the users can be virtual operating creators or those who execute operation in the virtual operating area, the tools means software executable in the computer hardware, and the operating authority rules regulate operating authority of the users in the virtual operating areas about the virtual operating area element objects.

In addition, the virtual operating area repository stores virtual operating area identifiers, virtual operating area element objects, user operating authority rules in the virtual operating area and share relationship information. The tool repository stores tools, a tool registration table and tool receiving information. The user repository stores user related information such as user identifiers. The users include computer system operators or automatic devices. The operating authority rule repository stores the operating authority rules.

The virtual operating area engine is a software system to support the users to operate virtual operating area and virtual operating area element objects, support storing of the virtual operating area repository or accessing the virtual operating area and virtual operating area element objects, support storing of tools in the tool repository and activate the tools to do execution in the virtual operating areas based on the tool registration table, tool receiving table and user operating authority rules. The embodiment also discloses the virtual operating area engine to support the users to search the virtual operating areas, enter the virtual operating areas, execute editing of operating rules, execute operation of the virtual operating area elements, execute the tools, and execute share publishing or receiving. The said executions take place in the virtual operating areas which the users have entered. The virtual operating area element objects are set by creators thereof. The said execute tools is set by tool developers thereof and the tool configuration document.

The virtual operating area tool configuration document integrated in the virtual operating area engine supports execution of the tools in the virtual operating areas. The tool processor is being configured and loaded with the tool registration table, virtual operating area repository and virtual operating area engine to generate the tool configuration document in virtual operating areas. The output devices output the said tool configuration document in virtual operating areas.

The share relationship means user's accessing mode of the shared objects, and can be divided into two types:

Common-share relationship: two or more users commonly share a virtual operating area or virtual operating area element object. These users can access the same copy of the object according to the same authority rules; and Copy-share relationship: two or more users individually share a virtual operating area or area element object. The object is existed in multiple copies in the system, and the users receive respectively a different copy and access the corresponding copy according to the same authority rules.

This embodiment also discloses the operating authority rules that are generated based on creator authority rules and the share relationship. The creator authority rules are related to operating authority rules on the virtual operating area element object created by the virtual operating area element object creator.

A tool merely performs in the virtual operating areas receiving and being installed with the tool, which is designated via the tool receiving table. While the tool is running it can input or output. The input includes total or part of the virtual operating area element objects in the receiving virtual operating area, or data obtained from input and output (I/O) devices. The output of a running tool includes effects generated by the tool in the tool-running environment of the virtual operating area which receives and runs the tool, or effects generated by the tool during running that are related to the whole system.

The tool registry table registers information related to tool running, including running environment requirements, input parameter requirements and output parameter information and the like. The tool receiving table registers information about the tools received in the virtual operating areas or by the users.

The output device stores in readable media the virtual operating area repository, tool repository, operating authority rule repository, user repository and tool configuration document in the said virtual operating areas.

As shown in FIG. 1, the system consists of a user operation interface, a virtual operating area layer consisted of multiple virtual operating areas, multiple tools installed in different virtual operating areas, a virtual operating area engine, a tool processor and multiple repositories and a tool receiving table. Through the user operation interface, users perform operations, access multiple repositories via the virtual operating area engine, get support to do operation relating to virtual operating areas and virtual operating area element objects, couple the virtual operating area tool configuration document, and perform operations of the tools in the virtual operating areas. The tool processor is coupled to the virtual operating area engine to generate the virtual operating area tool configuration document. The share relationship table registers user share publishing and receiving information. The tool receiving table registers the information about the receiving of tools in virtual operating areas.

Figure 2:
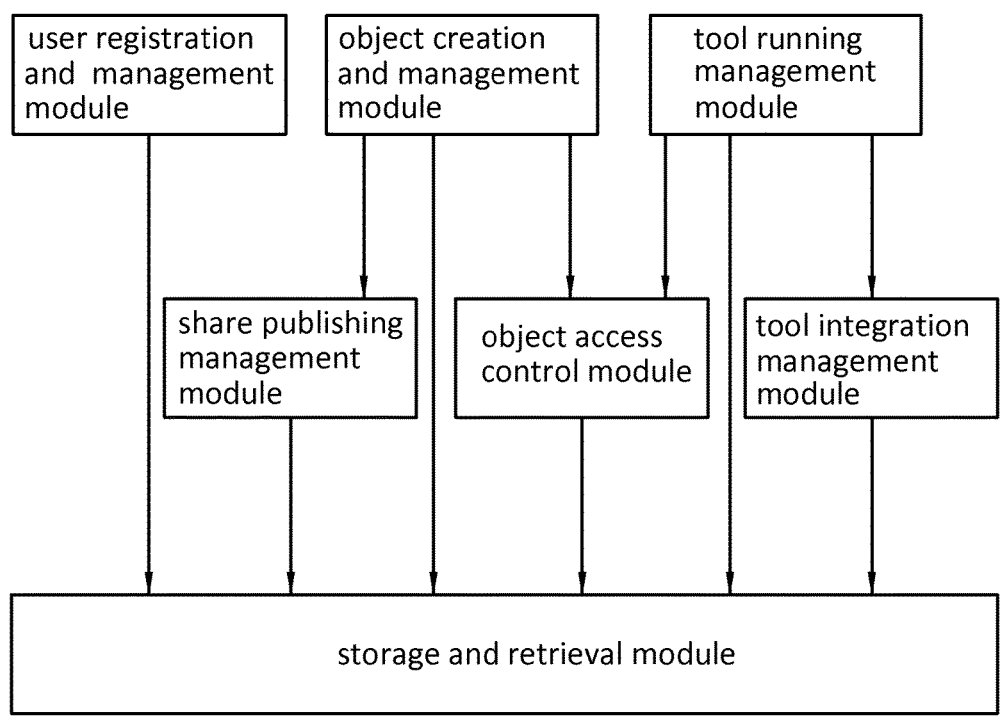
FIG. 2 is a functional block diagram of a virtual operating area engine.

Please referring to FIG. 2, the virtual operating area engine consists of a user registration and management module, an object creation and operation management module, a tool execution management module, a share publishing management module, an object accessing control module, a tool integration management module, and a storage and retrieval module. The storage and retrieval module provides the function for exchanging information with multiple repositories, providing the stored data, and searching and accessing data information from the repositories.

The object accessing control module controls the accessing and operation to virtual operating areas or virtual operating area element objects, inspects and verifies accessing users' operating authority, and prevents illegitimate accessing or operation. If the verification is accepted, the object accessing control module calls the storage and retrieval module to get object data and provide to the object accessing users.

The share publishing module does the processing of common sharing and copy sharing statements and receiving operations of the objects, registers related information of the operations in the related share relationship table, and stores permanently the share information through the storage and retrieval module.

The tool integration management module resolves conflicts between the virtual operating area engine and tool developing environment, and generates the tool configuration document in the virtual operating areas based on the virtual operating areas receiving tools, and stores the tool configuration document of the virtual operating areas in a permanent repository through the storage and retrieval module.

The object creation and operation management module supports users' various creation activities and other related operations in the virtual operating areas. These operations, if related to object accessing or saving, must be verified through the object accessing control module. The module, based on the share publishing management module, supports all share publishing and receiving operation. On the creation activities, the information of creator authority is registered via the object accessing control module, and stored in the permanent repository.

The user registration and management module is responsible for the function of system user registration and user management and the like, and stores user information in the repository via the storage and retrieval module.

The tool execution management module is responsible for the function that includes preparation and inspection of tool running environment for tool execution, execution activation and result transmission and the like. Before execution of a tool, the tool integration management module is called to generate and store the tool configuration document in the virtual operating area.

Embodiment 2

An operating method for a software architecture of virtual operating areas supporting customized definition, includes:
 creating users: store user information in a user repository;
 creating multiple virtual operating areas;
 creating multiple virtual operating area element objects for one virtual operating area;
 storing the creating information in a share relationship table, and storing the information of the created virtual operating areas or virtual operating area element objects, and storing the creating and share relationship table in a virtual operating area repository; and
 creating tools: store information of the tools in a tool repository;
 integrating the aforesaid virtual operating areas, users, tool repository into a virtual operating area engine; performing share publishing operations for the virtual operating area element objects, and saving share publishing definitions generated during the share publication operations in the share relationship table; in the event the shared area element object is a tool, store the share information of the tools in a tool receiving table; and creating a tool configuration document for virtual operating areas based on the tool repository, the virtual operating area engine, creator authority rules, the operating authority rules, the share relationship table, the tool registration table and the tool receiving table, tool developing environment and the virtual operating areas receiving the tools; generating operating authority rules based on the creator operating authority rules and the share relationship; entering one virtual operating area based on the operating authority rules; leaving one virtual operating area, and accessing the virtual operating area element objects according to the operating authority rules; and integrating the tool configuration document of the virtual operating areas to the virtual operating area engine; executing the tools in the virtual operating areas; and storing the virtual operating area repository, user repository, tool repository, and virtual operating area tool configuration document into computer permanent readable media.

Figure 3:
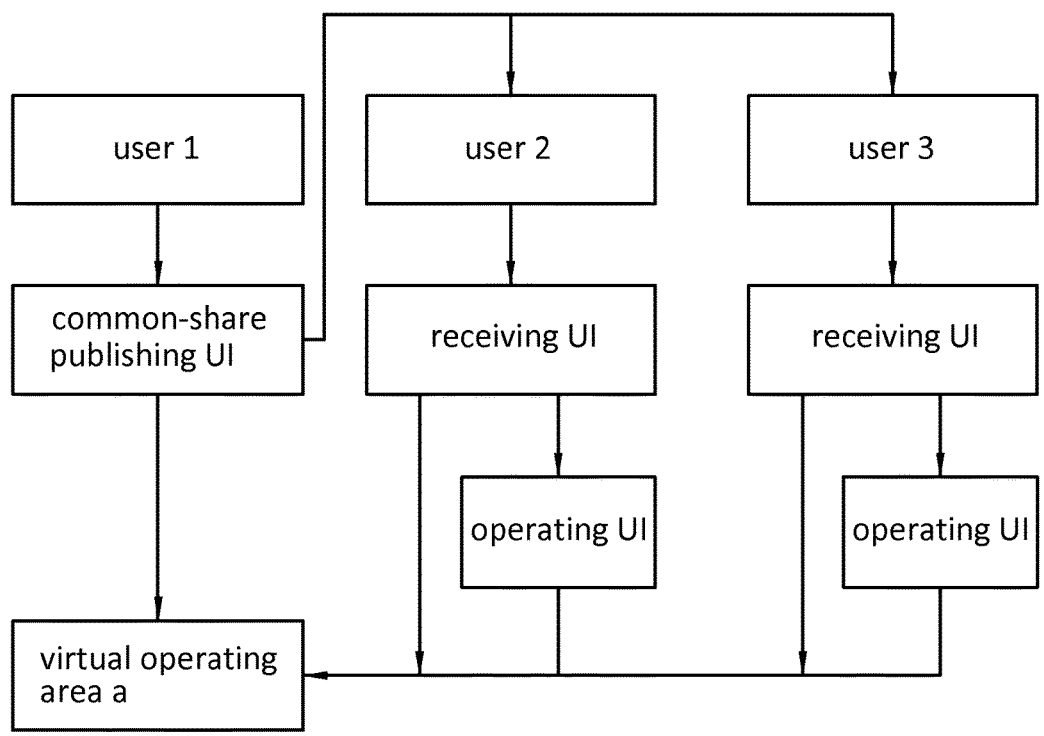
FIG. 3 is a flowchart of the operating method of the virtual operating area supporting customized definition according to the invention.

The share publishing operations allow a user who has share publishing authority share the related virtual operating areas or the virtual operating area element objects with other users so that the other users (or called receivers or share authorized users) can access or operate the related virtual operating areas and the element objects inside. Two publishing methods are provided, including:

Common-share publishing operation: allows multiple related receivers to do authorized accessing or operating related to one or one set of objects with the same authority rules;

Referring to FIG. 3, when a system user user1 provides a virtual operating area a via a common-share publishing interface to users user2 and user3, through a receiving interface the users2 and user3 become users of the virtual operating area a, hence can enter the virtual operating area a via the virtual operating area operation user interface to perform operation; and Copy-share publishing operation: build different copies for one or one set of related objects to allow each related receiver to receive a copy and perform authorized operation of accessing the different copy according to the same authority rules.

Figure 4:
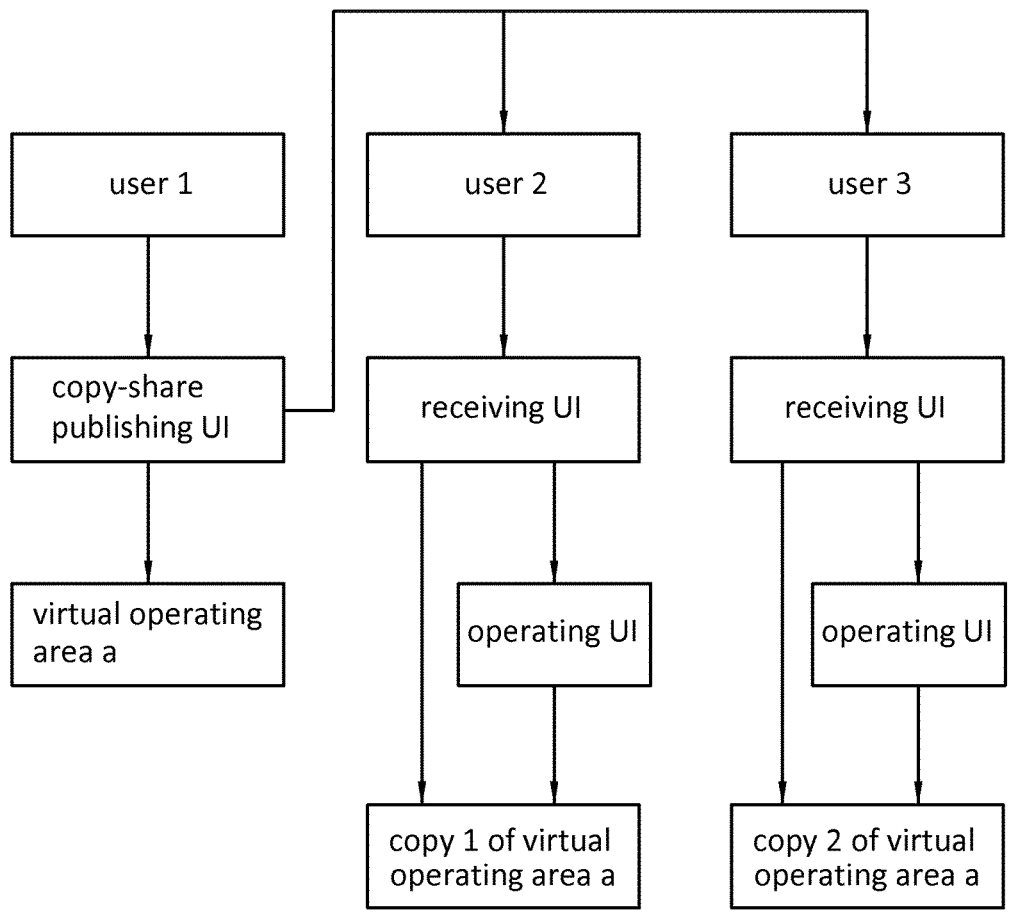
FIG. 4 is a flowchart of the common-share publishing method of the virtual operating area supporting customized definition according to the invention.

Please referring to FIG. 4, when a system user user1 copy-shares and publishes a virtual operating area a via the copy-share publishing interface to users user2 and user3, user2 receives a copy of the virtual operating area a via the receiving interface, namely a copy copy1 of the virtual operating area a and becomes its operation user, hence can enter the virtual operating area copy1 via the virtual operating area operation user interface to perform operation; similarly, user3 receives another copy of the virtual operating area a via the receiving interface, namely copy2 of the virtual operating area a and becomes its operation user, hence also can enter the virtual operating area via the virtual operating area operation user interface to perform operation.

Moreover, the share publishing definition is about the share publishing related information, including publishers, receivers and shared objects. A publisher is a user, the receivers include: users registered in a system, and virtual operating areas created in a system.

Figure 5:
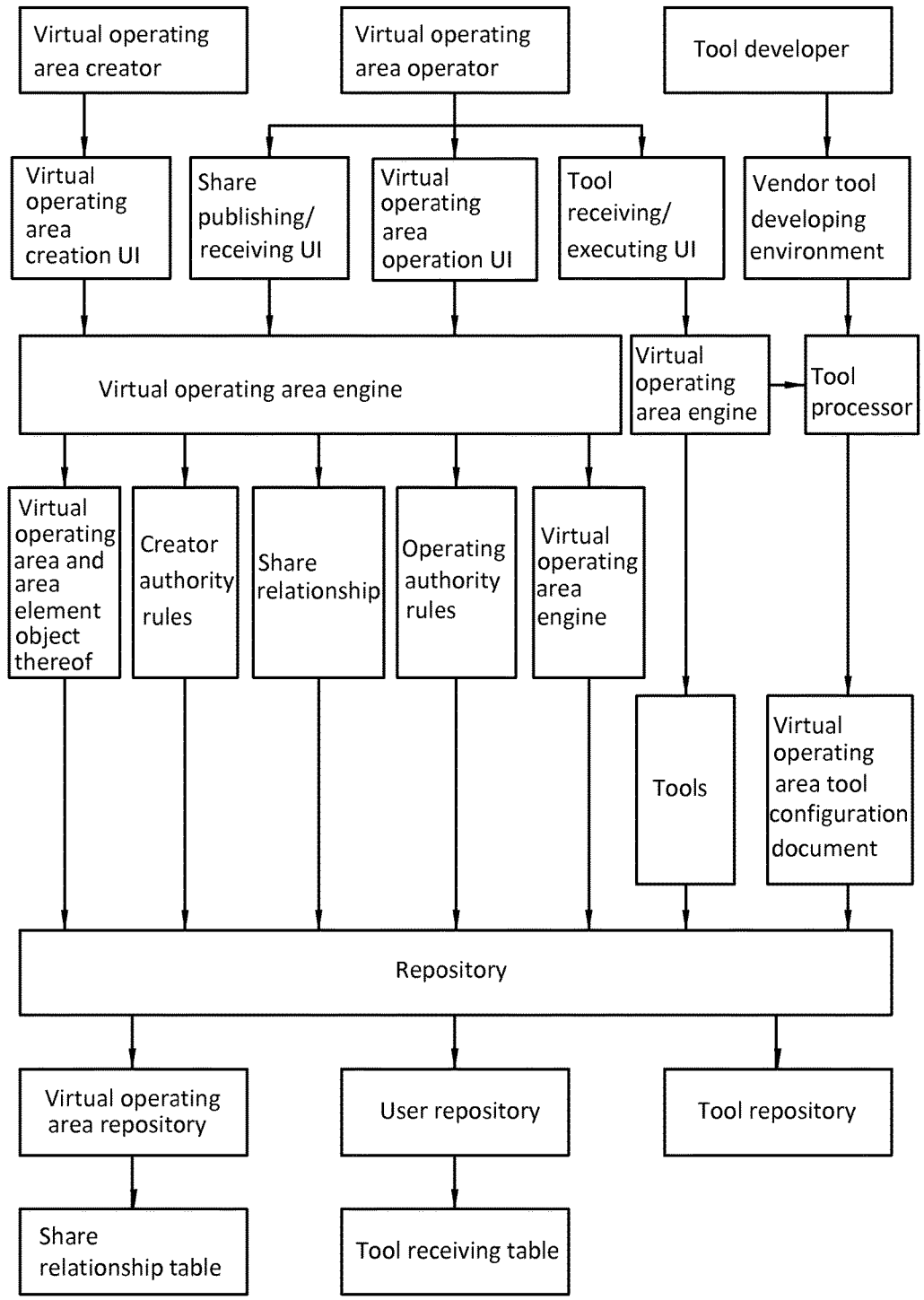
FIG. 5 is a flowchart of the copy-share publishing method of the virtual operating area supporting customized definition according to the invention.

Please refer to FIG. 5 for another embodiment in which the users are divided into a virtual operating area creator, a virtual operating area operator and a tool developer. The virtual operating area creator provides creation commands through a virtual operating area creation user interface. Similarly, the virtual operating area operator provides commands to a virtual operating area operation user interface, a share publishing/receiving user interface or a tool receiving/execution user interface, respectively.

Through these multiple user interfaces information are interpreted by the module of the virtual operating area engine. For instance, the virtual operating area creator sends creation commands to the virtual operating area engine via the virtual operating area creation user interface, the virtual operating area engine creates a virtual operating area and its element objects, and also establishes the creator authority rules stored in the repository.

In this embodiment the virtual operating area creator also is the virtual operating area operator. The virtual operating area operator issues sharing or receiving commands to the virtual operating area engine via the share/receiving user interface, the virtual operating area engine establishes share relationship based on these commands, and also sets up the operating authority rules, and all of these are stored in the repository.

In this embodiment the virtual operating area operator sends operation commands to the virtual operating area engine via the virtual operating area operation interface. The virtual operating area engine performs authority verification on operations via the preset authority rules, executes the operations, and the results are stored in the repository.

This embodiment further discloses the virtual operating area operator to issue commands of the share publishing, receiving, installing or executing of a tool to the virtual operating area engine via the tool operation user interface. This embodiment also indicates that the virtual operating area engine generates a virtual operating area tool configuration document via the tool processor. The tool processor is made by tool developers based on vendor's tool developing environments, and integrated into the virtual operating area engine. The published tools and generated virtual operating area tool configuration documents are stored in the repository.

The virtual operating area creator also creates one or more virtual operating areas based on business or actual requirement. Each virtual operating area can be corresponding to a business service, an issue or event of any granularity, and configure virtual operating area element objects in the virtual operating area according to business demands, such as file data, interactive rooms, tools and the like, to form an business processing virtual operating area. The virtual operating area creator further can share and publish (in a common or copy mode) the built virtual operating area to other users or virtual operating area operators according to business demands or personal preference. Other virtual operating area operators can receive the virtual operating area as a virtual operating area element object and put it into another related virtual operating area, and also enter the received virtual operating area to become a user of the virtual operating area, then according to authority rules interact with the existing users in the virtual operating area, operate related file data or execute related tool software. Operations in the virtual operating area can include uploading documents from a local document system to the virtual operating area, downloading files from the virtual operating area to the local document system, reading document files in the virtual operating area, deleting document files, entering interactive rooms for conversation, adding new chatting rooms, deleting the existing chatting rooms, installing and executing tools, or the like. In the event that authority is granted, the virtual operating area receiver can further publish the received virtual operating area and its virtual operating area element objects to other virtual operating area operators.

The virtual operating area operator can also publish a tool already registered in the system according to authority by the tool developer via the share publishing/receiving user interface. A tool already registered in the system means that a virtual operating area configuration document can be generated for the tool. Other virtual operating area operators, upon receiving the tool in a certain virtual operating area through the tool receiving interface, can generate a tool configuration document in the virtual operating area via the virtual operating area engine to finish installation (or deployment) of the tool in that virtual operating area, then the virtual operating area operator can execute the tool via the tool execution interface, namely, the tool can be executed in the virtual operating area. Based on business requirements, multiple suitable tools can be installed in one virtual operating area to complete preset business services.

Figure 6:
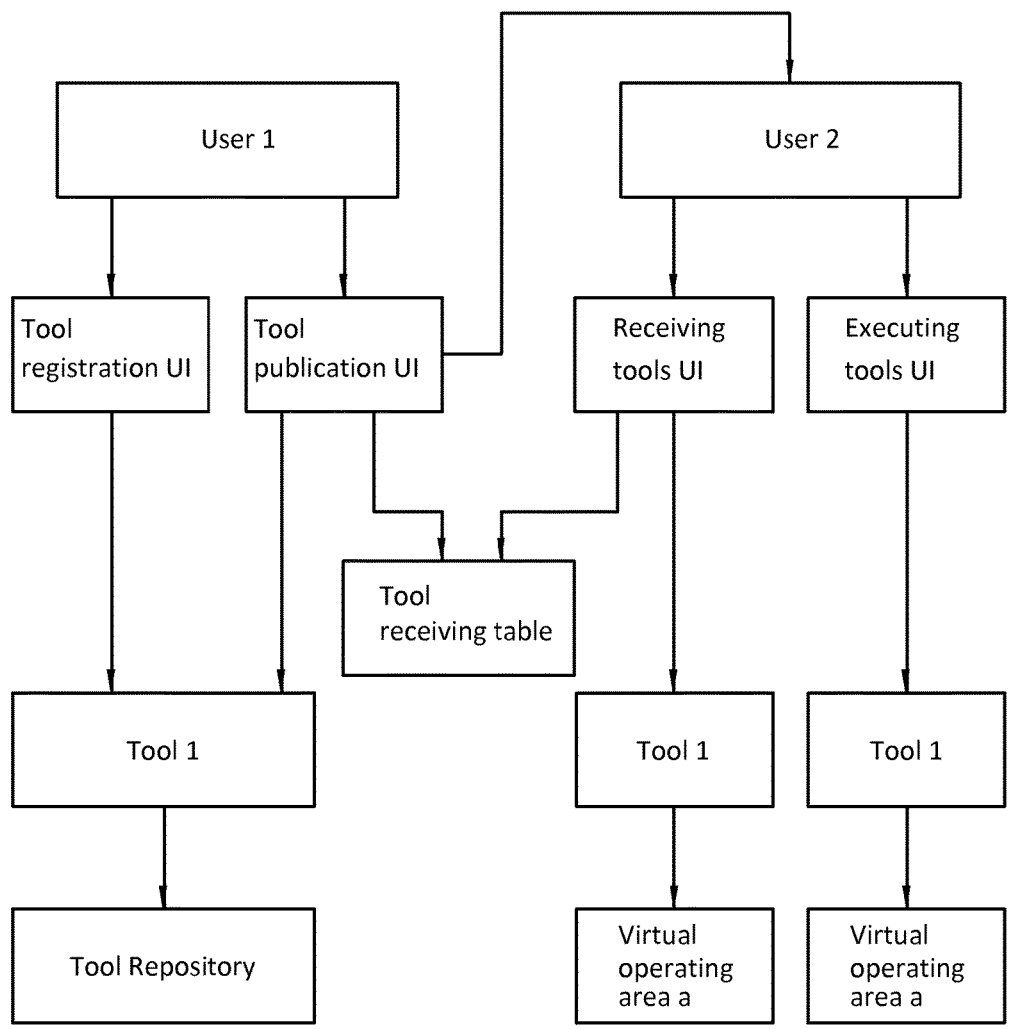
FIG. 6 is a flowchart of the tool publishing and operating method of the virtual operating area supporting customized definition according to the invention.

FIG. 6 illustrates operation process flow of tool registration and publication of user user 1, and tool receiving and execution of user user 2. In the process flow user 1 sends a tool 1 to the system via the tool registration user interface, and stores tool 1 in the tool repository after the registration has been successfully done. At this time as the creator, user 1 gains the publication authority, can publish tool 1 to user 2 through the tool publication user interface, and stores the publication related information into the tool receiving table. After receiving tool 1 via the receiving tool user interface, user 2 can deploy (install) in a virtual operating area 1, and store the related information in the tool receiving table. User 2 can execute tool 1 in area 1 via the execution tool user interface, and tool 1 can then run in area 1.

Figure 7:
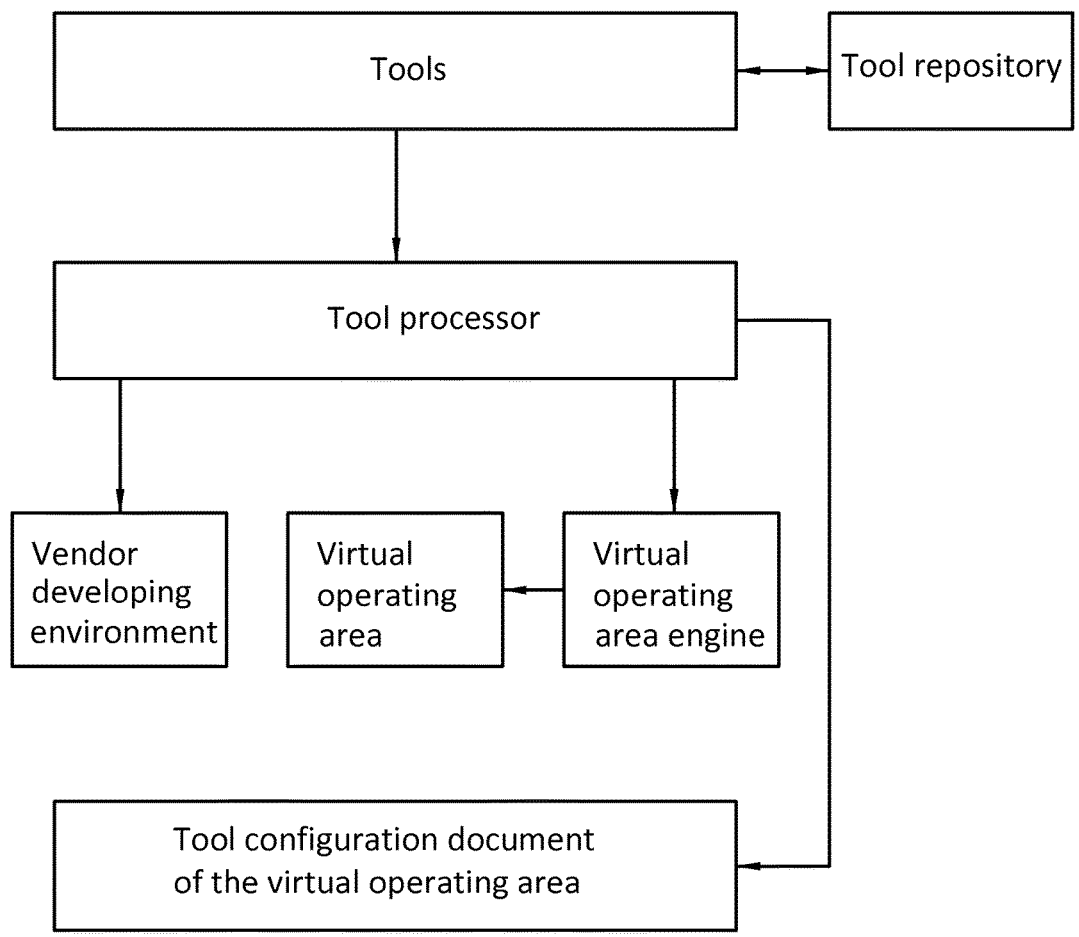
FIG. 7 is a flowchart of the tool processing method of the virtual operating area supporting customized definition according to the invention.

Referring to FIG. 7, after a tool is registered, it is stored in the tool repository. The tool processor, based on the vendor developing environment for tool development, accesses the virtual operating area required for publication and operation of the tool via the virtual operating area engine to generate the tool configuration document in the virtual operating area.

FIGS. 3 through 6 illustrate a virtual operating area to function as a service operating area. Suitable virtual operating area element objects and tools can be created and configured by a user who is familiar to the service, and the related users also can share the virtual operating area with other suitable users to enable the related persons to perform a same business task in a same virtualized service area. Due to the concepts of virtual operating area, virtual operating area element objects, share and tools introduced by the invention are oriented to ordinary users, they can easily understand these concepts and methods, hence the related user groups can gather together in virtual operating areas to perform creation, configuration, share publishing, receiving and operation of a virtual operating area or virtual operating area element objects about a business service or an issue and form the multiple mutually inclusive virtual operating areas. These virtual operating areas form a dedicated cooperative and interactive application system with the related users oriented to a specific issue or event. In such an application system software tool developers can develop the application software (tools) of specialized function according to user's demands, and publish to the required virtual operating areas or users via the tool publishing. In the virtual operating area including the received tool, the virtual operating area users can use the tool to accomplish specific missions. In such mode, the most complicated programming for business application architecture basically can be accomplished and adjusted by the users' selves through constructing and configuring the virtual operating areas, with no need for professional software developers to do the software requirement analysis, design, or coding as in conventional software engineering. The professional software developers can concentrate their efforts on design of specialized tools used in the related virtual operating area, somewhat like the design of functional areas of a house is responsible by the house user, but industrial products such as refrigerator in the kitchen and TV in the bedroom are taken over by the specialized vendors. Such an approach provides a desirable solution to solve the complicated problem of software development.

Embodiment 3

Figure 8:
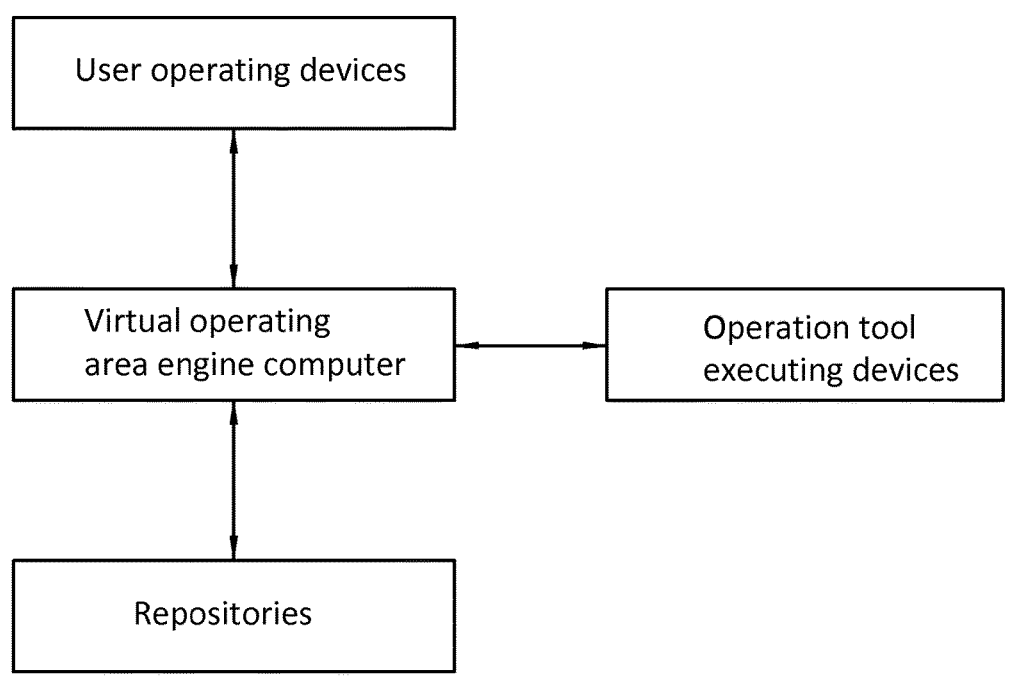
FIG. 8 is a block diagram of system equipment to run the virtual operating area supporting customized definition of the invention.

Please refer to FIG. 8 for a system device of a software system architecture oriented to virtual operating areas. It comprises a virtual operating area engine computer to run virtual operating area engine, process share relationship and execute operating authority rules, a user operating device coupled with the virtual operating area engine computer to execute user virtual operating area operations that includes creation and access operations of virtual operating area element objects, a repository coupled with the virtual operating area engine computer to store virtual operating area repository, tool repository, tool receiving table and tool configuration document, and a tool executing device coupled with the virtual operating area engine computer to run the tools.

The said virtual operating area engine computer has many types of integration ports to support information transmission with the said operating device, repository and tool execution device. It is to be understood that the related devices are non-restrictive, and can be software or hardware facilities, or control devices, control elements or the like.

Figure 9:
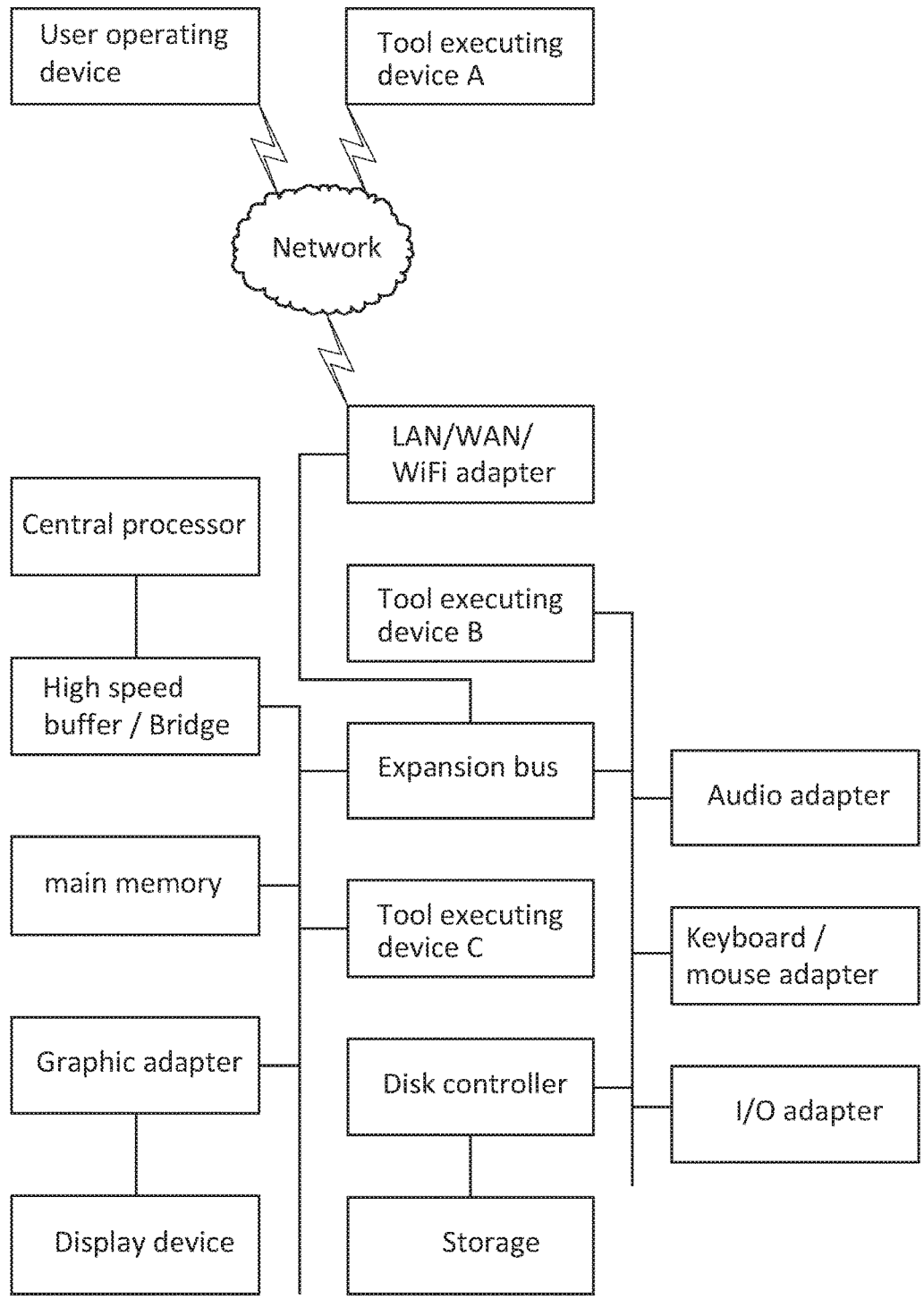
FIG. 9 is a block diagram of an example for implementing virtual operating area oriented application software according to the disclosed embodiments.

Please refer to FIG. 9 for a device which is implemented as a system that has the architecture partially or totally oriented to virtual operating areas. It is to be noted that the device can serve as a server or client terminal running one or multiple module components of a software that has the architecture oriented to virtual operating areas. The shown device includes a central processor connected to a two-stage high speed buffer which is linked to a high speed interconnection unit. In this embodiment the high speed interconnection unit also is called local system bus. The local system bus can be a peripheral component interconnect (PCI) architecture bus. In the example shown in the drawing, the main memory and graphic adapter are also connected to the local system bus. The graphic adapter can be connected to a display device.

Other peripheral devices, such as adapters of LAN/WAN/wireless (for instance WiFi), also can be connected to the local system bus through a kind of expansion bus. The expansion bus can link the local system bus to a low speed interconnection unit or device. In this embodiment, the low speed interconnection unit also is called input and output (I/O) bus. The I/O bus is connected to a keyboard/mouse adapter, a disk controller or an I/O adapter. The disk controller can be connected to the storage which can be any suitable devices that uses machine readable/writable storage media, including, but not limited to, non-loss media such as ROM or EEPROM, magnetic tape storage and user recordable media such as floppy disks, hard disk driver or optical disk storage (CD-ROM or DVD), and other known optical, electric or magnetic repositories.

In the shown example the I/O bus also is connected by an audio adapter and a keyboard/mouse adapter. These adapters provide connection for the related peripheral devices (not shown in the drawing).

It is known to those skilled in the art that the hardware shown in FIG. 9 can be changed for specific purposes. For instance, the shown hardware can be added or replaced by other peripheral devices such as printers or the like. The example shown in the drawing merely aims to facilitate interpretation, but not to limit the architecture, structure, method or devices of the invention.

The system device shown in the embodiment includes an operating system adopting a kind of graphic user interface. That operating system allows multiple display windows to present at the same time in the graphic user interface. Each display window provides a connection port for a different application process or different embodiment of the same application process. The optical cursor of the graphic user interface can be controlled by users through a positioning device to change the optical cursor position and/or generate events like click of a mouse button to produce required responses.

Any of various commercial operating systems can be used if modified properly, such as Microsoft Windows™, Linux™ or one version of Android™. All can be modified or built according to the invention.

LAN/WAN/Wireless adapters can be linked to a network which can include any public or specialized network or network combinations such as Internet that are known by those skilled in the art. User operating devices and tool executing device A can communicate with other portions of the system devices through the network. The user operating device can be any types of computer terminals, mobile device terminals or electronic device terminals specially designed, and can receive user input and output information to users. Tool executing device A also can be any device equipped with specific function and connectable to the aforesaid networks, and can communicate with other portions of the system device.

Tool executing device B is another connection example that can be directly connected to the I/O bus of the system device. Tool executing device C is yet another connection example that can be directly connected to the local system bus of the system device. The tool executing devices B and C also can be any devices with specific functions and capable of connecting to the aforesaid I/O bus, and can communicate with the other portions of the system device.

Figure 10:
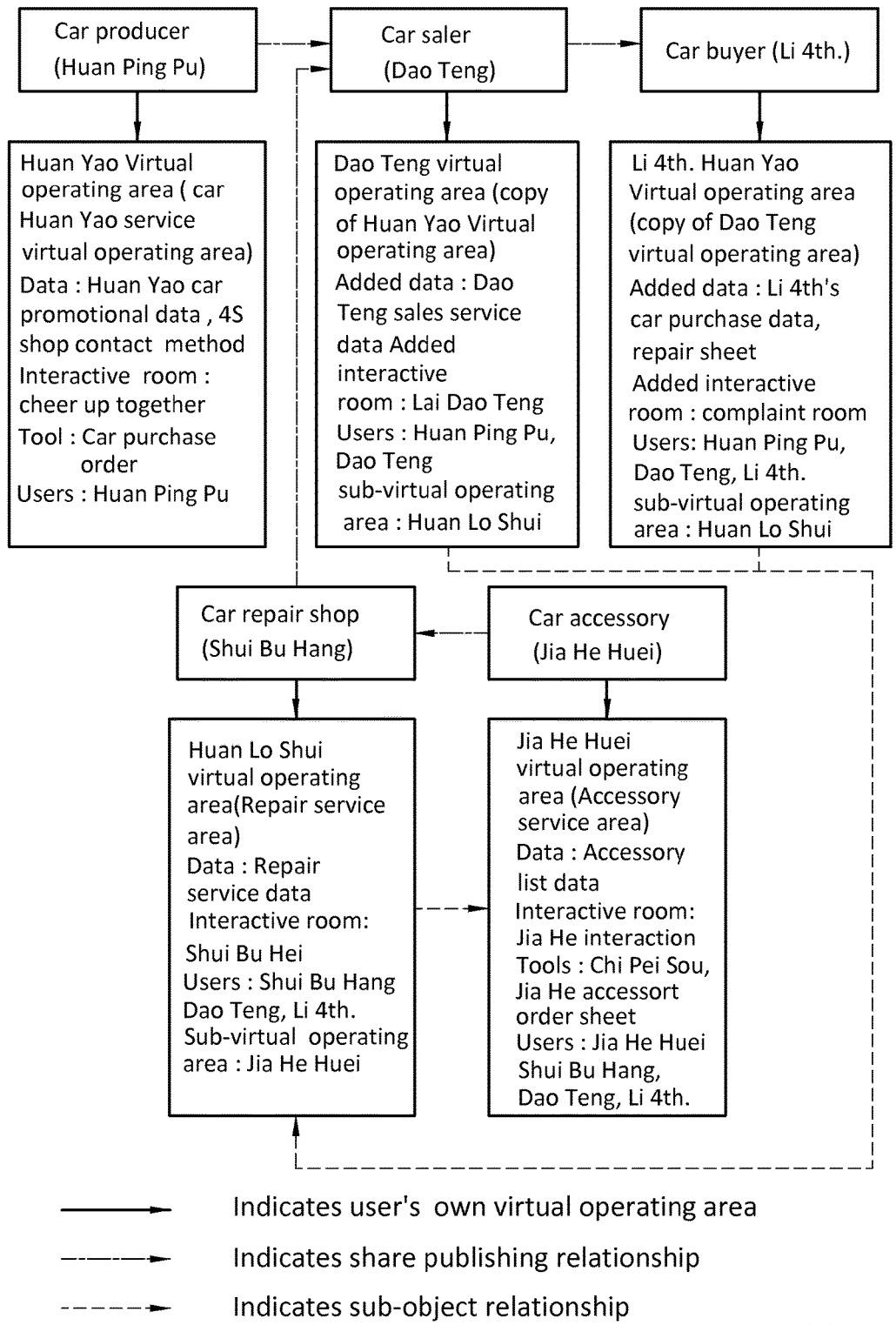
FIG. 10 is a schematic block diagram of an embodiment example for establishing a vehicle sales and maintenance business application system through the techniques of the invention.

FIG. 10 illustrates an example of building a virtual operating area application system for automobile sales and maintenance services that adopts the techniques and software system architecture provided by the invention. Car producer Huan Ping Pu has established a car virtual operating area called "Huan Yao" for its newest car model Huan Yao. The Huan Yao virtual operating area includes commercial and technical file data, materials for 4S shops, materials for customer complaint to Huan Ping Pu and the like. The producer also sets up an chatting room called "Cheer Up Together". It also installed an order tool for car purchasing that is developed by Huan Ping Pu.

Accessory vendor "Jia He Huei" supplies accessories of Huang Yao car, and also sets up an accessory service virtual operating area called "Jia He Express" which includes all types of accessory lists and price file data, and also has set up a chatting room called "Jia He interaction" for customers to make interaction with service people of "Jia He Huei".

The virtual operating area further includes an enquiry tool called "Chi Pei Sou" for searching accessories and an accessory order sheet tool. These tools also are developed by "Jia He Huei" and published for its own use.

Repair service shop "Shui Bu Hang" has set up a virtual operating area called "Huan Lo Shui" to provide repairs and maintenance services for the Huan Yao cars. That virtual operating area includes repairs and maintenance file data loaded for "Shui Bu Hang" customers, and an interactive room called "Shui Bu Hei" is also established.

The accessory vendor "Jia He Huei" has shared and published "Jia He Express" to the repair shop "Shui Bu Hang". Users of "Shui Bu Hang" can receive that virtual operating area and put it into the "Huan Lo Shui" virtual operating area. While "Jia He Huei" offers common-share publishing, it also gives authority to any user of "Shui Bu Hang" to continuously enter "Jia He Express" virtual operating area to do accessory search and order tool operation, and reading of files and interaction.

Car producer Huan Ping Pu offers copy-share publishing of the virtual operating area "Huan Yao" to car dealer "Dao Teng" which receives a copy of the virtual operating area "Huan Yao" to form a virtual operating area "Dao Teng Huan Yao", and adds data of "Dao Teng sales service data" into it while accepting sample cars.

Users of "Shui Bu Hang" offer common-share of the virtual operating area "Huan Lo Shui" to the car dealer "Dao Teng" situated at the same location, and authorize "Dao Teng" the right of share publishing of "Huan Lo Shui". "Dao Teng" receives the virtual operating area "Huan Lo Shui" and loads it into the virtual operating area "Dao Teng Huan Yao".

The car dealer "Dao Teng" further offers copy publishing of the virtual operating area "Dao Teng Huan Yao" to a buyer "Li 4th." who receives a copy of "Dao Teng Huan Yao", a virtual operating area called "Li 4th. Huan Yao". Besides the original virtual operating area elements in "Li 4th. Huan Yao", "Dao Teng" adds extra sales data and a complaint interactive room dedicated for Li 4th. In the virtual operating area, "Li 4th." also can post orders, complaints and get other services in the virtual operating area. Because "Li 4th. Huan Yao" includes users "Huan Ping Pu" and "Dao Teng", and also includes virtual operating areas "Huan Lo Shui" and "Jia He Express" as the sub elements, hence after "Li 4th." has received the virtual operating area "Li 4th. Huan Yao" he can enter thereof and interact with many users and do operations to get various types of services.

In the embodiment previously discussed, while a virtual operating area is copy or common shared, the elements in the virtual operating area also can be copy or commonly shared according to business requirements. For instance, when the virtual operating area "Huan Yao" is published, commonly interested elements such as some propaganda files, communication materials, chatting room "Cheer Up Together" and car order tool can be set up for common-share publishing.

What is claimed is:

1. A hardware system architecture including a plurality of virtual operating areas supporting customized definition, comprising:

an user operating device connected to a virtual operating area computer, the virtual operating area computer comprising:
a central processor connected to a two-stage high speed buffer which is linked to a local system bus; and
a main memory connected to the local system bus;
the virtual operating area computer to run a virtual operating area engine, process an information in a share relationship table and execute a plurality of operating authority rules;
the user operating device connected to the virtual operating area computer to execute a plurality of operations of the virtual operating areas including a creating operation and an accessing operation of a plurality of area element objects;
a repository connected to the virtual operating area computer to store a virtual operating area repository, a tool repository, a tool receiving table and a tool configuration document;
a tool executing device connected to the virtual operating area computer; and the virtual operating areas supporting customized definition, further comprising:
one or more of the virtual operating areas which include one or more of the area element objects and the operating authority rules, the area element objects including a plurality of users, a plurality of file data, a plurality of tools, and other the virtual operating areas, wherein the users includes a plurality of virtual operating area creators and operators, the file data includes a plurality of computer documents in various formats, the tools are software and hardware systems, and the operating authority rules specify a plurality of operating authorities of the users regarding the area element objects;
the share relationship table to specify share relationship regarding the operating authorities of the different users for the same virtual operating area or the same area element object;
the virtual operating area engine which is a supporting software to support the users to operate the virtual operating areas and the area element objects;
the tool configuration document integrated in the virtual operating area engine to describe tool calling fashion, running locations of the tools, input parameters and output result storage location of the tools;
the repository including the virtual operating area repository to store the virtual operating areas and related information thereof which includes a plurality of virtual operating area identifiers, the area element objects, the operating authority rules and the share relationship tables, the tool repository to store the tools, a tool registration table and the tool receiving table, and a user repository to store the users and a plurality of user identifiers, wherein the users includes a plurality of computer system operators or automatic equipments;
a tool processor loading a plurality of tool registration tables, the virtual operating area repository, the virtual operating area engine and the virtual operating areas to generate the tool configuration document corresponding to the virtual operating areas to register a plurality of tool identifiers, the virtual operating area identifiers of the tool running locations, a pair table of the tool input parameters and the area element objects, a pair table of the tool output parameters and the area element objects, operating authority information of the operators, tool execution code storage addresses and tool execution code calling fashions; and
a user input and output interface to interact with the users.

2. The hardware system architecture of claim 1, wherein the virtual operating area computer includes an interconnection unit connecting with external hardware devices or a plurality of interconnection units that interconnects to each other for connecting with external hardware devices.

3. The hardware system architecture of claim 1, wherein the tool executing device is a part of the virtual operating area computer or connects to the virtual operating area computer through three approaches, including:
- connecting to a network controlling unit of the virtual operating area computer enabled for network connection, the network being a local area network, a wide area network or a wireless network;
- connecting directly to the interconnection components of the virtual operating area computer; and
- connecting directly to a peripheral interface of the virtual operating area computer, wherein the interface includes universal serial bus (USB) ports, RS-232 ports, line print terminal (LPT) ports, Bluetooth ports and infrared ports.

4. The hardware system architecture of claim 1, wherein the user operating device supports interactive input and output with the users.

5. The hardware system architecture of claim 1, wherein the virtual operating area computer includes device control and management software to support information transmission with the user operating devices, the repository and the tool executing devices.

\* \* \* \* \*